(12) United States Patent
Riefe et al.

(10) Patent No.: US 7,185,918 B2
(45) Date of Patent: Mar. 6, 2007

(54) LINEAR TRACKING COLUMN MODULE WITH PEDAL ASSEMBLY

(75) Inventors: Richard K. Riefe, Saginaw, MI (US); Bruce M. Collier, Saginaw, MI (US); Richard P. Nash, Frankenmuth, MI (US); Minoo J. Shah, Farmington Hills, MI (US); Alan C. Davis, Fenton, MI (US); Frederick J. Berg, Auburn, MI (US); Ronald H. Dybalski, Oxford, MI (US)

(73) Assignee: Delphi Technologies, Inc., Troy, MI (US)

( * ) Notice: Subject to any disclaimer, the term of this patent is extended or adjusted under 35 U.S.C. 154(b) by 381 days.

(21) Appl. No.: 10/767,916

(22) Filed: Jan. 29, 2004

(65) Prior Publication Data
US 2005/0029794 A1 Feb. 10, 2005

Related U.S. Application Data

(60) Provisional application No. 60/473,787, filed on May 28, 2003, provisional application No. 60/444,297, filed on Jan. 31, 2003.

(51) Int. Cl.
*B62D 1/19* (2006.01)

(52) U.S. Cl. .......................... 280/777; 74/512

(58) Field of Classification Search ................ 280/777, 280/779, 780, 748, 750; 74/512, 516; 180/315, 180/274, 271; *B62D 1/19*
See application file for complete search history.

(56) References Cited

U.S. PATENT DOCUMENTS

| 5,181,435 | A | * | 1/1993 | Khalifa et al. ................ 74/492 |
| 6,149,196 | A | * | 11/2000 | Guiard et al. ............... 280/777 |
| 6,283,508 | B1 | * | 9/2001 | Nouwynck et al. ......... 280/753 |
| 6,375,220 | B1 | * | 4/2002 | Kamm ........................ 280/777 |
| 6,591,927 | B1 | * | 7/2003 | Honekamp et al. ........... 180/90 |
| 6,615,685 | B2 | * | 9/2003 | Miyoshi et al. ............... 74/512 |

FOREIGN PATENT DOCUMENTS

FR 2715368 A1 * 7/1995

* cited by examiner

*Primary Examiner*—Paul N. Dickson
*Assistant Examiner*—Tiffany L. Webb
(74) *Attorney, Agent, or Firm*—Michael D. Smith

(57) ABSTRACT

A collapsible steering assembly features a steering mechanism and a pedal assemble united and supported together by a support structure as a unitized module for shipping and attachment to a vehicle. The support structure supports the pedal assembly for movement beyond the fully depressed position of one of the pedal therein in response to a predetermined collapse force on the pedal.

37 Claims, 10 Drawing Sheets

LINEAR TRACKING COLUMN MODULE WITH PEDAL ASSEMBLY

CROSS-REFERENCES TO RELATED APPLICATIONS

This Application claims the benefit of U.S. Provisional Patent Application No. 60/473,787 filed on May 28, 2003, and U.S. Provisional Patent Application No. 60/444,297 filed on Jan. 31, 2003.

FIELD OF THE INVENTION

The subject invention relates to a vehicle steering assembly having components movable in response to a crash condition.

BACKGROUND OF THE INVENTION

Adjustable steering column assemblies are well known in the art. Such assemblies typically include an energy-absorbing bracket or other support affixed to the body of a vehicle. Steering column components including, but not limited to a steering wheel and shaft are carried by the support. Should a collision occur in which a sufficiently large impact force is applied to the steering wheel, the steering column and wheel will collapse relative to the support and translate away from the driver of the vehicle.

Steering column and pedal assemblies exist which are designed to absorb forces other than those applied to the steering wheel of a vehicle. Such assemblies include those in which the foot pedals are mounted on the vehicle support structure independently of the mounting of the steering column, and where the pedals collapse under an applied collapse load in a crash event. An object of the present invention is to improve upon and simplify the manufacturing of collapsible column and pedal assemblies.

SUMMARY OF THE INVENTION AND ADVANTAGES

The present invention provides a collapsible steering assembly including a steering mechanism and at least one foot pedal that is moveable in operation between a fully retracted position and a fully depressed position. A support structure connects the pedal or pedals to the steering mechanism to define a unitized module. The support structure supports the steering mechanism for collapsing movement in response to a predetermined collapse force on the steering mechanism. The support structure further supports the pedal or pedals for collapsing along a predetermined collapse path beyond the fully depressed position in response to application of another predetermined collapse force to the pedal or pedals.

Accordingly, the subject invention overcomes the limitations of the related art by providing a collapsible steering column assembly which utilizes guide rods to interconnect a steering assembly and pedal assembly with a single support structure to create a unitized module which may then be transported unit to an end user and installed as a single unit on a vehicle. The guide rods are capable of collective movement for permitting the steering assembly and pedal assembly to not only simultaneously translate relative to the support, but also independently move with respect to one another and to the support. The pedal assembly is mounted on the support structure in a manner that permits the pedal assembly to travel along a collapse path that is non-parallel to the longitudinal axis of the steering assembly.

The subject invention also includes a knee bolster interconnected by the guide rods to the support structure. The guide rods are distributed into two groups, with one group carrying the knee bolster and the other carrying the steering assembly. This permits independent movement of the knee bolster, pedal assembly and steering assembly relative to one another. The guides are also oriented to allow the knee bolster and steering assemblies to translate in directions other that those parallel to the longitudinal axis of the steering assembly. In particular, the guides translate in directions corresponding to the typical trajectory paths of the upper torso and knees of a driver in a collision, which maximizes the energy absorbed by the assembly. The guides are also spaced to provide enhanced stability to the support, which minimizes the likelihood of accidental collapse of any one of the components of the assembly.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Referring to the Figures, wherein like numerals indicate like or corresponding parts throughout the several views, a collapsible steering assembly is generally shown at 20 in FIGS. 1 through 14. The assembly 20 includes a steering mechanism 22 and at least one and preferably two foot pedals shown generally at 24. The pedals 24 are movable in operation between a fully retracted position "$P_1$" and a fully depressed position "$P_2$" for actuating an operating system in a vehicle 26.

Figure 3:
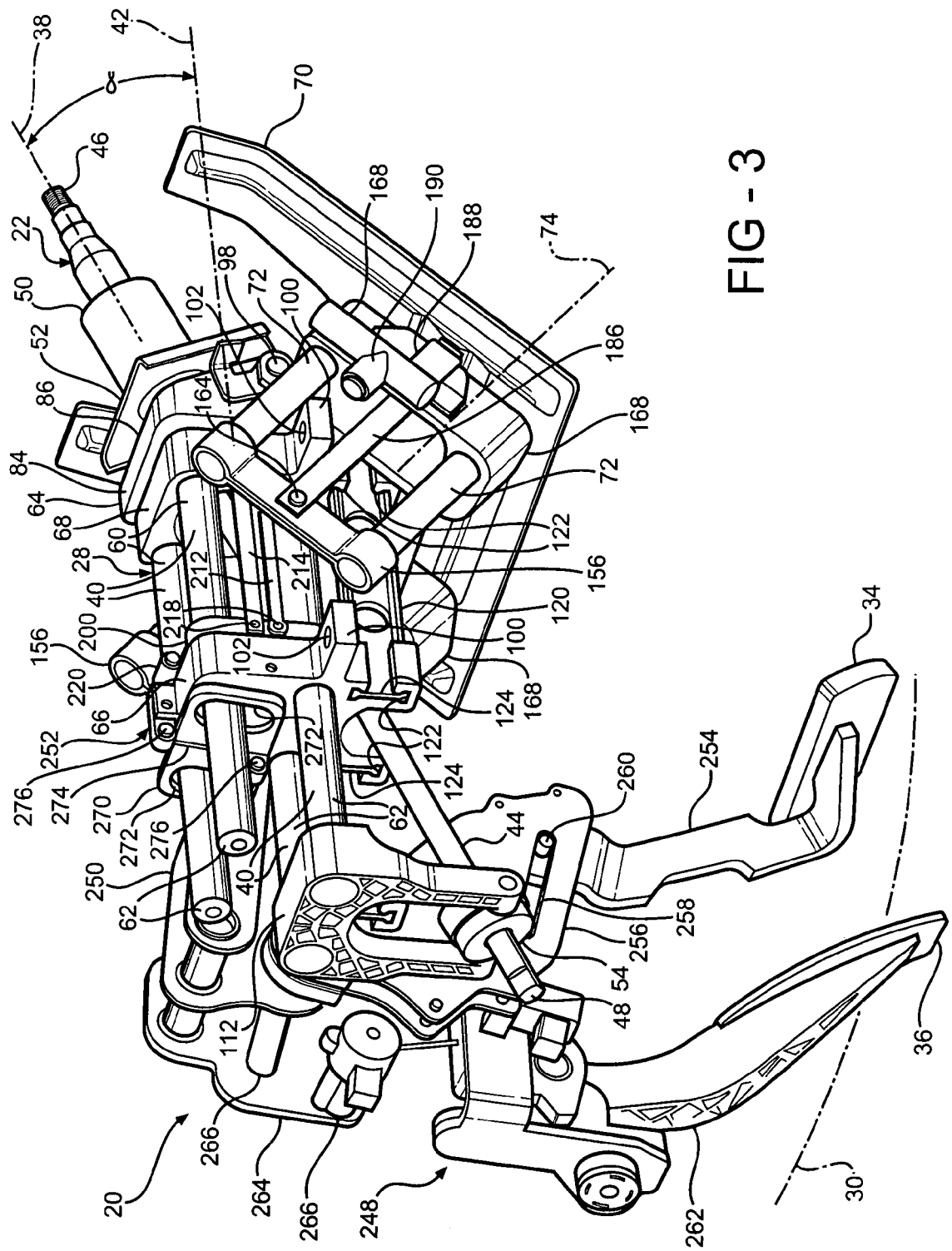
FIG. 3 is a perspective view of the steering column assembly shown in FIG. 2 after a collision event, with the steering assembly and knee bolster in respective collapsed positions and the lever arm removed.

A support structure 28 connects the pedals 24 to the steering mechanism 22 to define a unitized module operant from any support structure of the vehicle to which the assembly will be mounted. The support structure 28 supports the steering mechanism 22 for collapsing movement in response to application of a predetermined collapse force to the steering mechanism 22. The support structure 28 also supports each pedal 24 for collapsing along a predetermined collapse path 30 beyond the fully depressed position "$P_2$" in response to application of a predetermined collapse force 32 to the pedal 24. FIG. 3 shows the pedals 24 collapsed beyond the fully depressed position. Each pedal 24 is collapsible independently of the steering mechanism 22. As is described in greater detail below, one pedal 24 is a brake pedal 34. The other pedal 24 is a throttle pedal 36.

The steering mechanism 22 has a longitudinal steering axis 38 that extends transversely to the predetermined collapse path 30. A plurality of steering guide rods 40 are arranged about a common collapse axis 42 in non-parallel relationship to the steering axis 38. The steering guide rods 40 interconnect the brake pedal 34 with the support structure 28 and guide movement of the brake pedal 34 along the predetermined collapse path 30 beyond the fully depressed position "$P_2$" in response to application of the predetermined collapse force to the brake pedal 34. The steering guide rods 40 also interconnect the pedals 24 and the steering mechanism 22.

Figure 11:
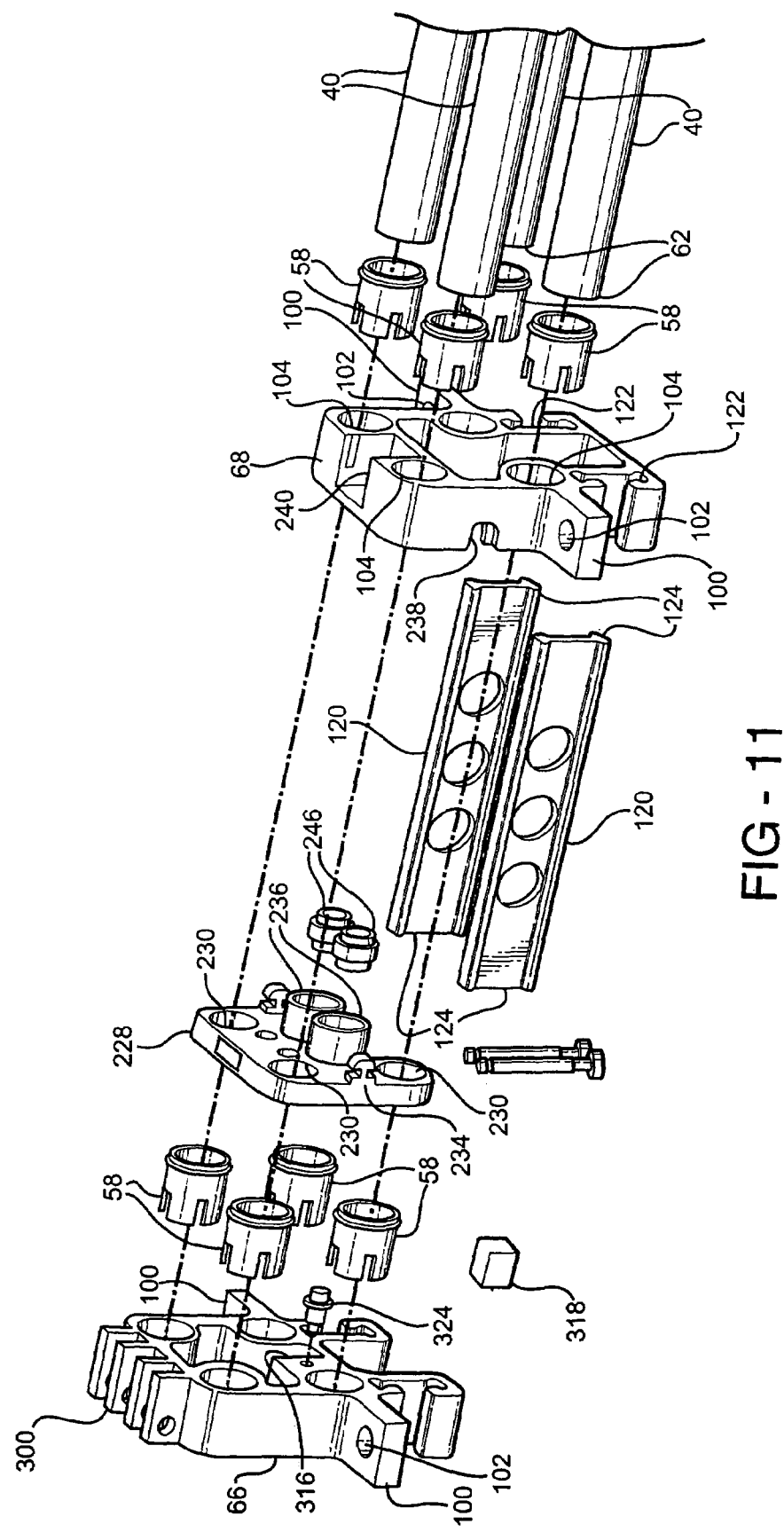
FIG. 11 is an exploded perspective view of a steering column assembly according to FIG. 2 and utilizing an alternative pedal assembly.

The steering mechanism 22 includes a steering shaft 44 extending coaxially with the steering axis 38 between upper and lower ends 46 and 48, respectively. An upper bearing housing 50 and a rake bracket 52 are coaxially disposed about the steering shaft 44 adjacent the upper end 46. A lower bearing housing 54 is coaxially disposed about the steering shaft 44 adjacent the lower end 48. An alternative rake bracket 56 having a curved outer edge is shown in FIG. 11.

Although the steering mechanism 22 of the present invention is a steering column assembly, those skilled in the art will appreciate that the steering mechanism 22 used in the assembly 20 need not be limited to one utilizing a traditional, mechanical linkage column structure. The steering mechanism 22 may comprise, for example, an electric steer-by-wire system which may or may not include a mechanical shaft 44.

Steering shear elements 58 interconnect the steering guide rods 40 and the support structure 28. The steering shear elements 58 prevent the steering mechanism 22 from moving relative to the support structure 28, and shear in response to application of the predetermined collapse force on the steering mechanism 22, which in turn allows the steering guide rods 40 and the steering mechansim 22 to move relative to the support structure 28.

The steering guide rods 40 are fixed relative to one another, which permits collective movement of the guide rods 40 relative to the support structure 28. Although each of the steering guide rods 40 may have any suitable shape, each guide rod 40 of the embodiments of the present invention is straight and comprises a tube having a front end 60 and a rear end 62. The steering guide rods 40 shall hereinafter be referred to as steering tubes 40. Although any number of steering tubes 40 may be utilized and arranged in any suitable configuration relative to the support structure 28, four of such steering tubes 40 are preferably spaced from one another in a quadrangle.

The support structure 28 includes a front bracket 64 that interconnects the front ends 60 of the steering tubes 40. A rear bracket 66 supports the rear ends 62 of the steering tubes 40 and the steering mechanism 22. The front and rear brackets 64 and 66 are spaced on opposite sides of an intermediate bracket 68. The rear ends 62 of the steering tubes 40 extend through the rear bracket 66.

A second plurality of steering shear elements 58 interconnects the rear bracket 66 and the steering tubes 40. The steering shear elements 58 normally prevent movement of the steering tubes 40 relative to the rear bracket 66, but shear in response to the predetermined force for allowing the steering tubes 40 to move through the rear bracket 66.

The assembly 20 also includes a knee bolster 70 coupled to the support structure 28. A plurality of bolster guide rods 72 are arranged about a second collapse axis 74 and interconnect the intermediate bracket 68 and said knee bolster 70. The bolster guide rods 72 support the knee bolster 70 for axial movement along the second collapse axis 74 in response to application of a second predetermined collapse force to the knee bolster 70. A plurality of bolster shear elements 76 interconnect the bolster guide rods 72 and the intermediate bracket 68. The intermediate bracket 68 supports the bolster guide rods 70 in fixed relationship to one another. The shear elements 76 prevent movement of the knee bolster 70 relative to the intermediate bracket 68 and shear in response to application of the second predetermined collapse force to the knee bolster 70. This allows the bolster guide rods 72 and the knee bolster 70 to move relative to the intermediate bracket 68.

While each of the bolster guide rods 72 may have any suitable shape, each guide rod 72 is a straight tube that has a front end 78 and a rear end 80. The bolster guide rods 72 shall hereinafter be referred to as bolster tubes 72. Any number of bolster tubes 72 may be utilized and arranged in any suitable configuration relative to the support structure 28. The assembly 20 includes four of the bolster tubes 72. The tubes 72 are spaced from one another in a quadrangle. The knee bolster 70 is connected to the front ends 78 of the bolster tubes 72, and the rear bracket 66 supports the rear ends 80, which in turns spaces the knee bolster 70 and the rear bracket 66 from and on opposite sides of the intermediate bracket 68.

While any appropriate shearable device may be used, the steering shear elements 58 and bolster shear elements 76 of the present invention preferably comprise bushings. Each bushing surrounds one of the tubes 40 or 72 and engages one of either the intermediate bracket 68 or the rear bracket 66. Each bushing also has a detent or other feature which maintains the tube 40 or 72 in a fixed position relative to the intermediate bracket 68 or rear bracket 66 during normal operation. The detents or other features on the bushings maintaining the linkage between the intermediate bracket 68 or the rear bracket 66 and the respective tubes 40 or 72 will be broken, or "shear", upon application of a sufficient collapse force to the steering mechanism 22 or the knee bolster 70. This overcomes the holding force on the tubes 40 or 72 and releases the tubes 40 or 72 for movement relative to the intermediate bracket 68 or rear bracket 66.

The front bracket 64 includes a central opening 82 and a peripheral edge 84 from which a collar 86 extends. A collar 86 having an alternative shape is shown in FIG. 11. The upper end 46 of the steering shaft 44, the upper bearing housing 50, and the rake bracket 52 extend through the opening 82. The lower end 48 of the steering shaft 44 extends beyond the rear bracket 66, whereby the front bracket 64, intermediate bracket 68 and rear bracket 66 are spaced along the steering shaft 44 between the upper and lower ends 46 and 48.

A rake assembly is generally shown at 88. The rake assembly 88 interconnects the rake bracket 52 with the front bracket 64 and permits selective pivotal movement of the steering shaft 44 relative to the intermediate bracket 68 and front bracket 64. The rake assembly 88 includes an adjustment mechanism 90 disposed against the front bracket 64 and engaging the steering shaft 44 for moving the steering shaft 44 relative to the opening 82. A spring 92 interconnects tabs 94 extending from the rake bracket 52 and front bracket 64 for supporting the steering shaft 44 at a preselected rake angle ($\alpha$) relative to the steering tubes 40. The collar 86 has a slot 96 through which a complementary nut and bolt assembly 98 extends for interconnecting the adjustment mechanism 90 with the steering shaft 44 and maintaining the shaft 44 at the preselected rake angle ($\alpha$).

Figure 7:
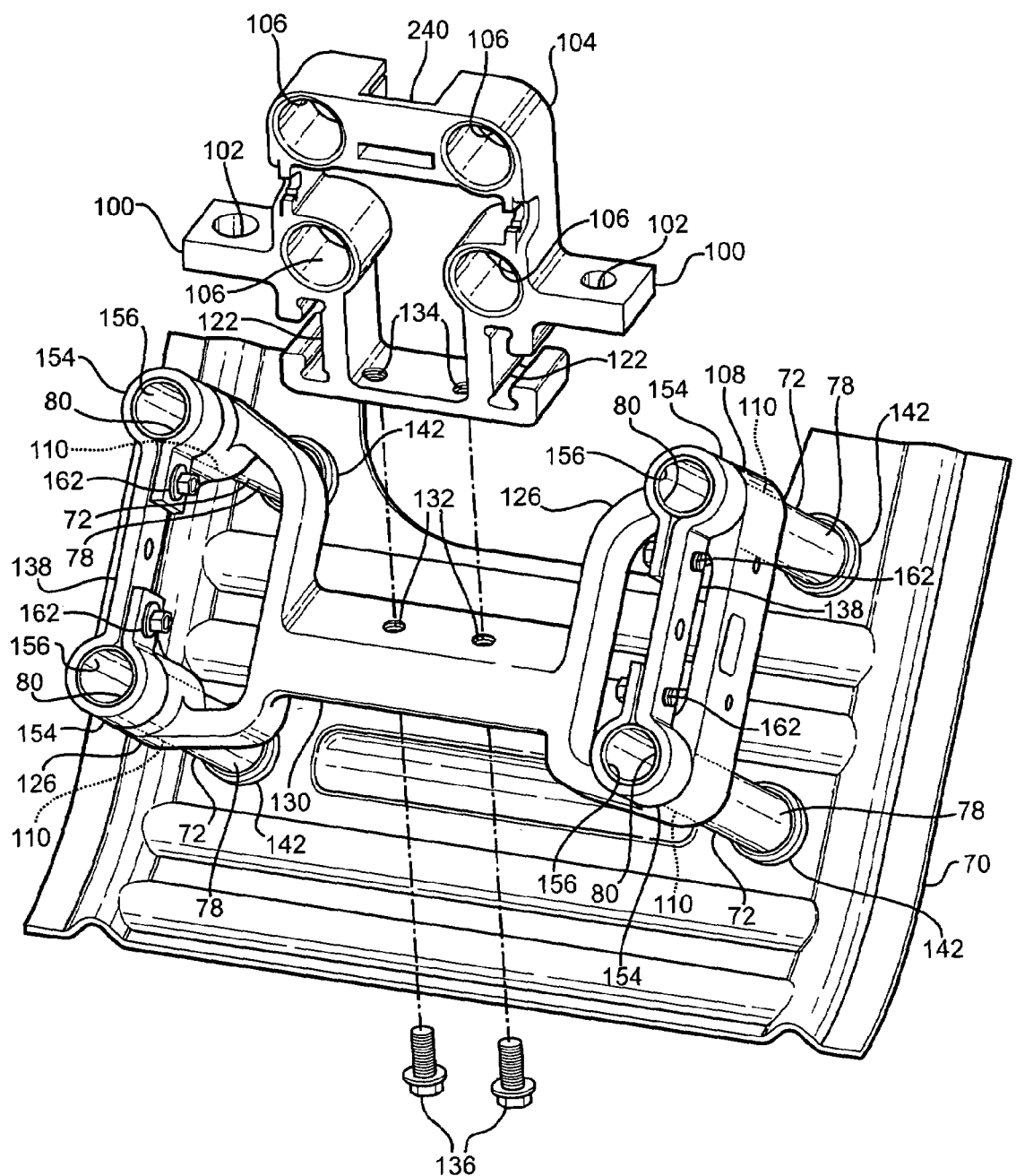
FIG. 7 is an exploded perspective view of the knee bolster and lower and upper blocks illustrating the manner in which the lower block is connected to the upper block.
Figure 8:
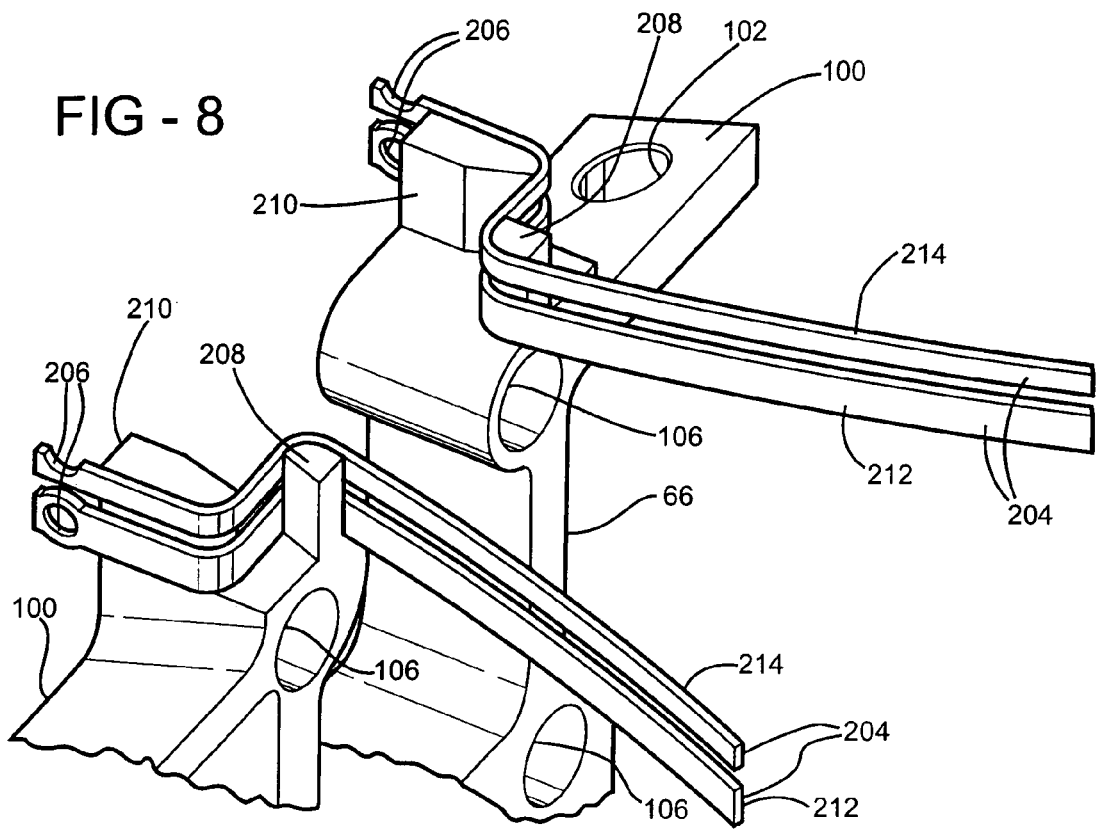
FIG. 8 is a partial perspective view of the upper block and pairs of high-force and low-force straps of one of the second anvil-strap devices utilized in the steering column assembly shown in FIGS. 1 through 3.

The rear bracket 66 includes at least one and preferably two connectors 100 for attachment to the vehicle 26. The intermediate bracket 68 likewise includes at least one and preferably two connectors 100 for attachment to the vehicle 26. Each connector 100 has a hole 102 extending therethrough for receiving a complementary bolt (not shown) to permit attachment to the vehicle 26. As is best shown in FIG. 7, the intermediate bracket 68 includes an upper block 104 having bores 106 therethrough. The steering tubes 40 extend through the bores 106. The intermediate bracket 68 also includes a lower block 108 having bores 110 therethrough. The bolster tubes 72 extend through the bores 110 in the lower block 108.

The steering tubes 40 of the assembly 20 include an upper pair and a lower pair. A steering mechanism support bracket 112 interconnects the lower pair and supports the steering mechanism 22. The steering mechanism support bracket 112 has spaced arms 114 with bores 116 extending therethrough. The lower bearing housing 54 extends between the arms 106. Pivot pins 118 are received within the bores 116 for pivotally connecting the lower bearing housing 54 to the steering mechanism support bracket 112, which permits pivotal movement of the steering mechanism 22 relative to the steering mechanism support bracket 112.

The assembly 20 of the present invention also includes at least one and preferably two beams 120 which interconnect the upper block 104 and the rear bracket 66 to prevent relative movement therebetween. The upper block 104 and rear bracket 66 include slots 122. The beams 120 have opposed ends 124 that are received within the slots 122.

Referring specifically to FIG. 7, the manner in which the lower block 108 is connected to the upper block 104 is shown. The lower block 108 includes spaced bracket segments 126 through which the bores 110 extend. The bracket segments 126 are interconnected by a web 130 having threaded bores 132 extending therethrough. The upper block 104 includes complementary threaded bores 134, which are aligned with the bores 132. Threaded fasteners 136 are received within respective pairs of the aligned bores 132 and 134 for connecting the lower block 108 to the upper block 104.

The bolster tubes 72 of the assembly 20 are disposed in at least one pair on either side of the steering tubes 40. The bolster tubes 72 are also disposed transversely to the steering tubes 40. Two pairs of bolster tubes 72 are preferred, and each pair extends through the bores 110 in a selected one of the bracket segments 126.

Disposing the bolster tubes 72 outside the steering tubes 40 permits the knee bolster 70 to collapse without interfering with or otherwise initiating a simultaneous or subsequent collapse of the steering tubes 40 and steering mechanism 22. Positioning the bolster tubes 72 at a transverse angle to the steering tubes 40 orients the stroke path of the knee bolster 70 at an angle complementary to the normal trajectory of the knees of a vehicle operator or a passenger as the knees impact and simultaneously translate with the bolster 70 along the second collapse axis 74 in response to application of the second predetermined force on the bolster 70.

Figure 6:
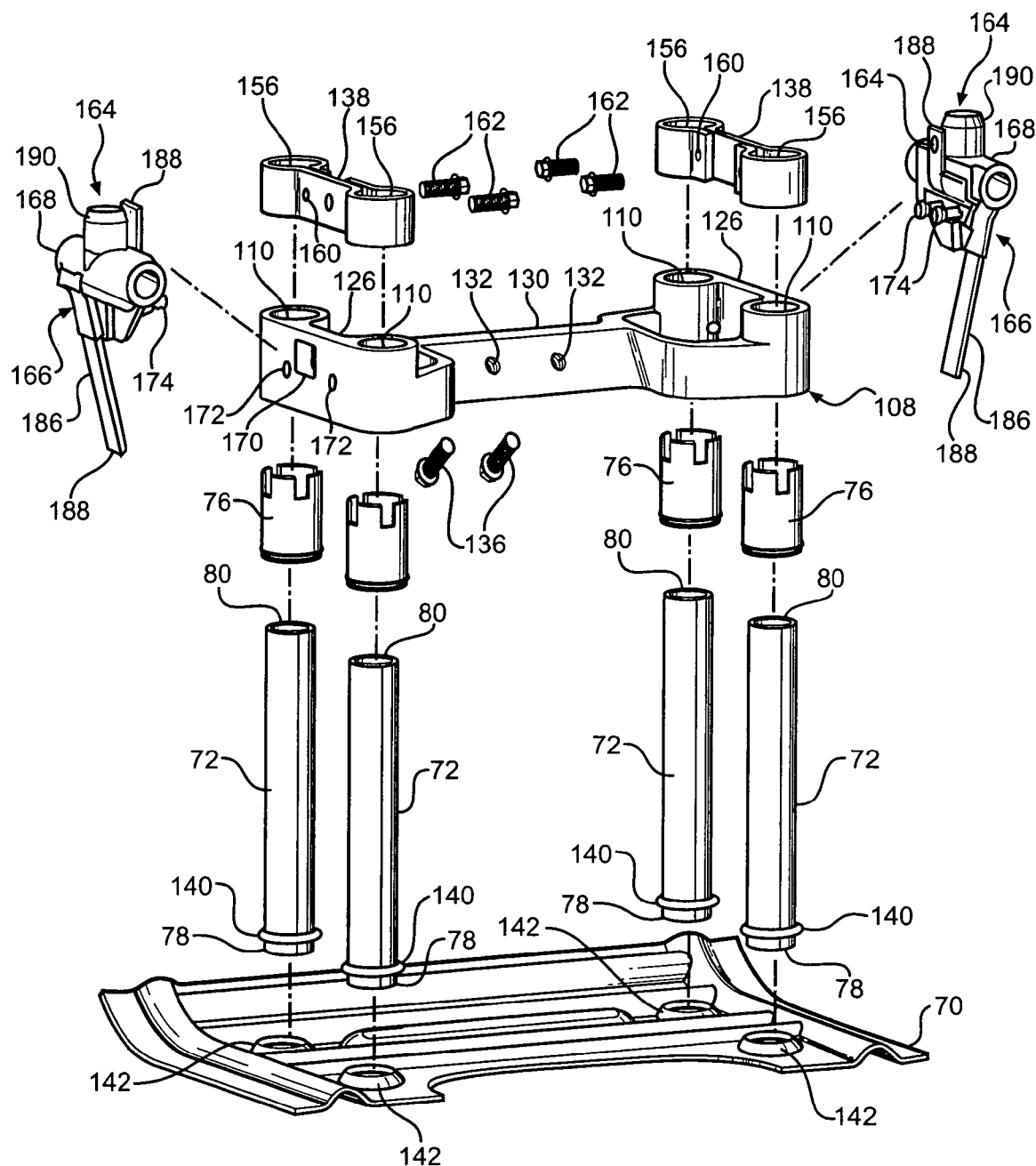
FIG. 6 is an exploded perspective view of the knee bolster, bolster tubes and selected components associated therewith of the embodiment of the invention shown in FIGS. 1 through 3.

One of two connective clamps 138 interconnects the rear ends 80 of each pair of bolster tubes 72. The knee bolster 70 is supported by the front ends 78 of both pairs of bolster tubes 72. Referring specifically to FIG. 6, an annular ridge 140 on each of the front ends 78 is disposed in engagement with one of a plurality of annular rims 142 disposed on the bolster 70.

Figure 5:
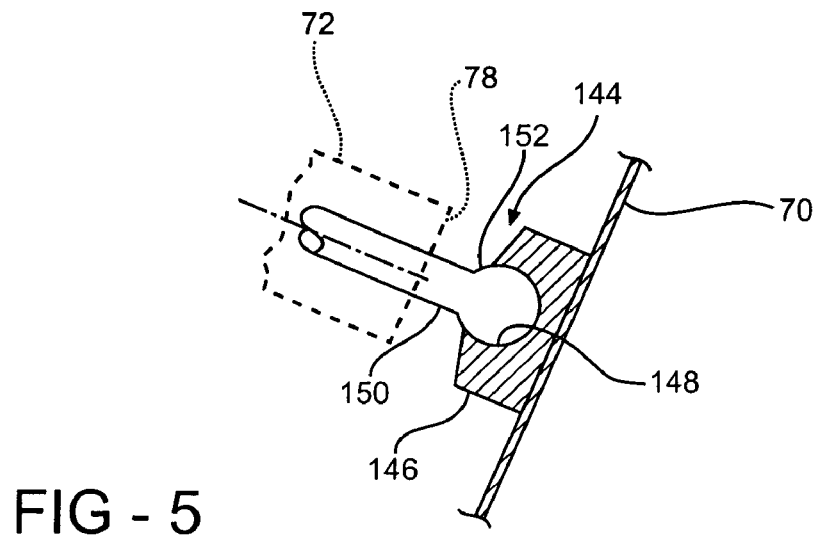
FIG. 5 is a cross-sectional view of a pivot assembly utilized in an alternative embodiment of the invention for pivotally connecting a bolster tube to the knee bolster.

As is shown in FIG. 5, the front end 78 of each bolster tube 72 may alternatively be connected to the bolster 70 using one of a plurality of pivot assemblies 144. Each pivot assembly 144 includes a collar 146 defining a concave pivot surface 148. A shank 150 extends from the end 78 to an end sphere 152. The sphere 152 is captured within the collar 146 and pivots relative to the surface 148.

The knee bolster 26 is preferably fabricated from a deformable material such as metal and, as such, is deformable upon impact with the knees of a vehicle operator. The pivot assemblies 144 accommodate the deformation and bending forces imparted to the bolster 70 during such an impact by pivoting to allow the bolster 70 to bend relative to the bolster tubes 72 without imparting a bending moment to the bolster tubes 72. The forces normally applied to the bolster 70 are instead applied in the axial direction of the bolster tubes 72.

Each clamp 138 extends between opposed cylindrical ends 154 having openings 156 within which the rear ends 80 are received. As is shown in FIG. 6, the clamp 138 includes holes 160 adjacent each end 154. Complementary fasteners 162 are received within the holes 160 for securing the adjacent cylindrical end 154 about the rear end 158.

Although the knee bolster 70 is a single panel, the bolster 70 may alternatively be bifurcated to form a panel having left and right sections capable of independent movement relative to one another. The bolster 70 and components associated therewith may alternatively be adapted for use on the passenger side of the vehicle 26 or in any other passenger seating area within the vehicle 26.

The assembly 20 also includes an energy absorber system 164 for absorbing movement of the steering mechanism 22 and pedals 24 respectively relative to the intermediate bracket 68. The energy absorber system 164 of the assembly 20 also includes at least one and preferably two first anvil-strap devices generally shown at 166. Each anvil-strap device 166 interconnects a selected one of the clamps 138 with the lower block 108. The anvil-strap devices 166 absorb energy upon movement of the bolster tubes 72 through the lower block 108 in response to the second predetermined collapse force.

Referring again to FIG. 6, each anvil-strap device 166 includes a housing 168 disposed against one of the bracket segments 126. Each bracket segment 126 has a central opening 170 interposed between spaced holes 172. The housing 168 includes spaced connectors 174 which are received within the holes 172 for securing the housing 168 against the bracket segment 126.

Figure 4:
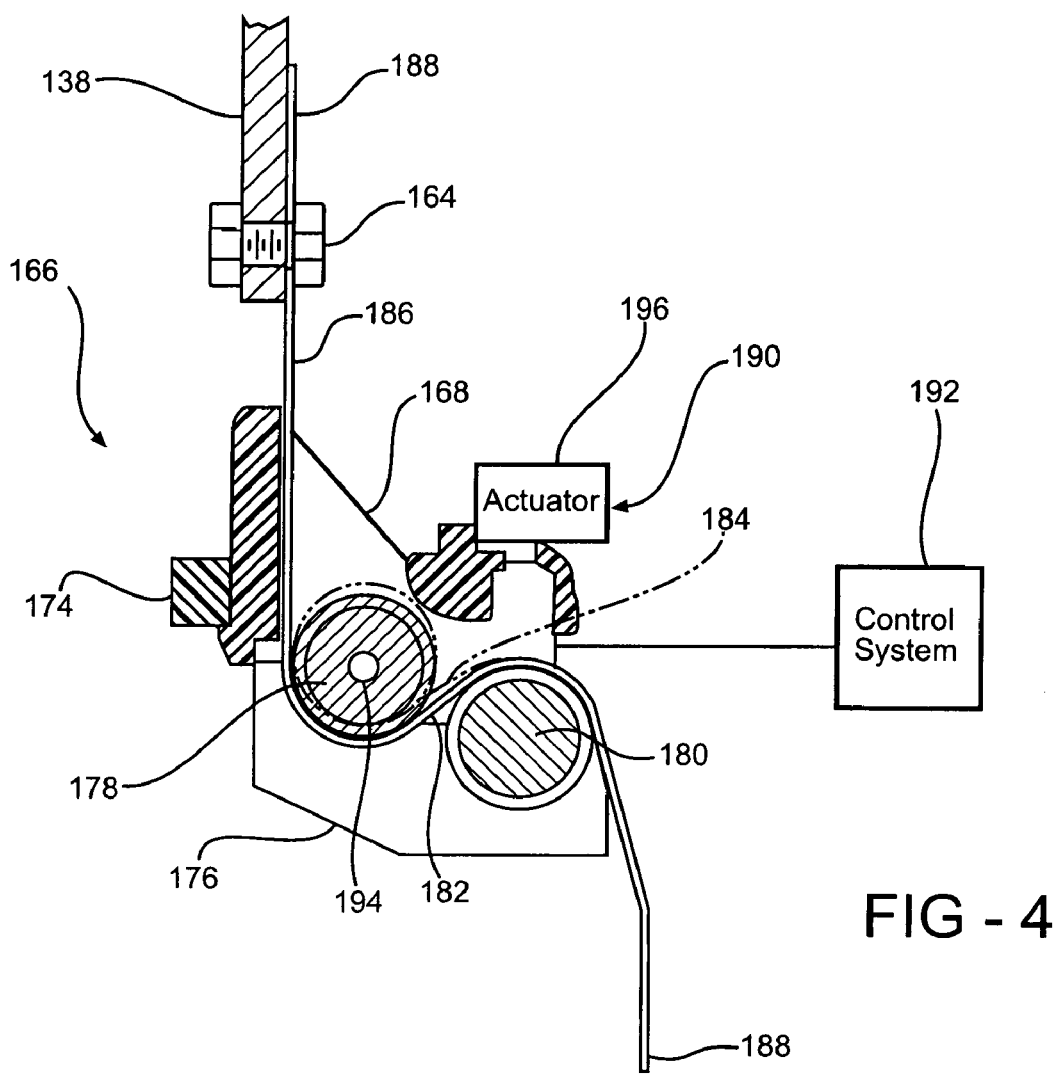
FIG. 4 is a cross-sectional view of one of the first anvil-strap devices utilized in the steering column assembly shown in FIGS. 1 through 3.

As is shown in FIG. 4, an anvil block 176 has at least one and preferably two oppositely arranged anvils 178 and 180 disposed within the housing 168. The anvils 178 and 180 are spaced from one another in one of two preselected positions to define one of two tortuous pathways 182 and 184. A plastically deformable strap 186 having opposed ends 188 extends through the housing 168 along the first tortuous pathway 182 in frictional and bending engagement with the anvils 178 and 180. One end 188 is secured to the clamp 138 by a nut and bolt assembly 164. This permits the strap 186 to be pulled through the housing 168 along the first pathway 182 and simultaneously drawn against the anvils 178 and 180 for absorbing a controlled amount of energy as the bolster tubes 72 move relative to the lower block 108.

The anvil-strap device 166 also includes a pyrotechnic assembly 190 for selectively controlling the amount of energy absorbed by the strap 186. The pyrotechnic assembly 190 is carried by the housing 168 and communicates with an external control system 192. The control system 192 functions to position the anvil 178 in a selected one of the pathways 182, 184 dependent upon one or more variable conditions existing prior to or during the crash condition.

Each pyrotechnic assembly 190 includes at least one explosive pin 194 that extends through the anvil 178. A pyrotechnic actuator 196 is carried by the housing 168 and communicates with the pin 194. The actuator 196 is selectively actuated by the control system 192 to cause the pin 194 to explode or otherwise be effectively removed from the anvil 178. This permits lateral movement of the anvil 178 and creates the second tortuous pathway 184.

Although the anvil-strap devices 166 of the assembly 20 are variable energy absorbing systems that utilize S-straps, one skilled in the art will appreciate that other energy absorbing devices may be used, including but not limited to those which employ one or more M-straps, J-straps, other straps, wires, pyrotechnic or other actuating devices, or a combination thereof.

Figure 1:
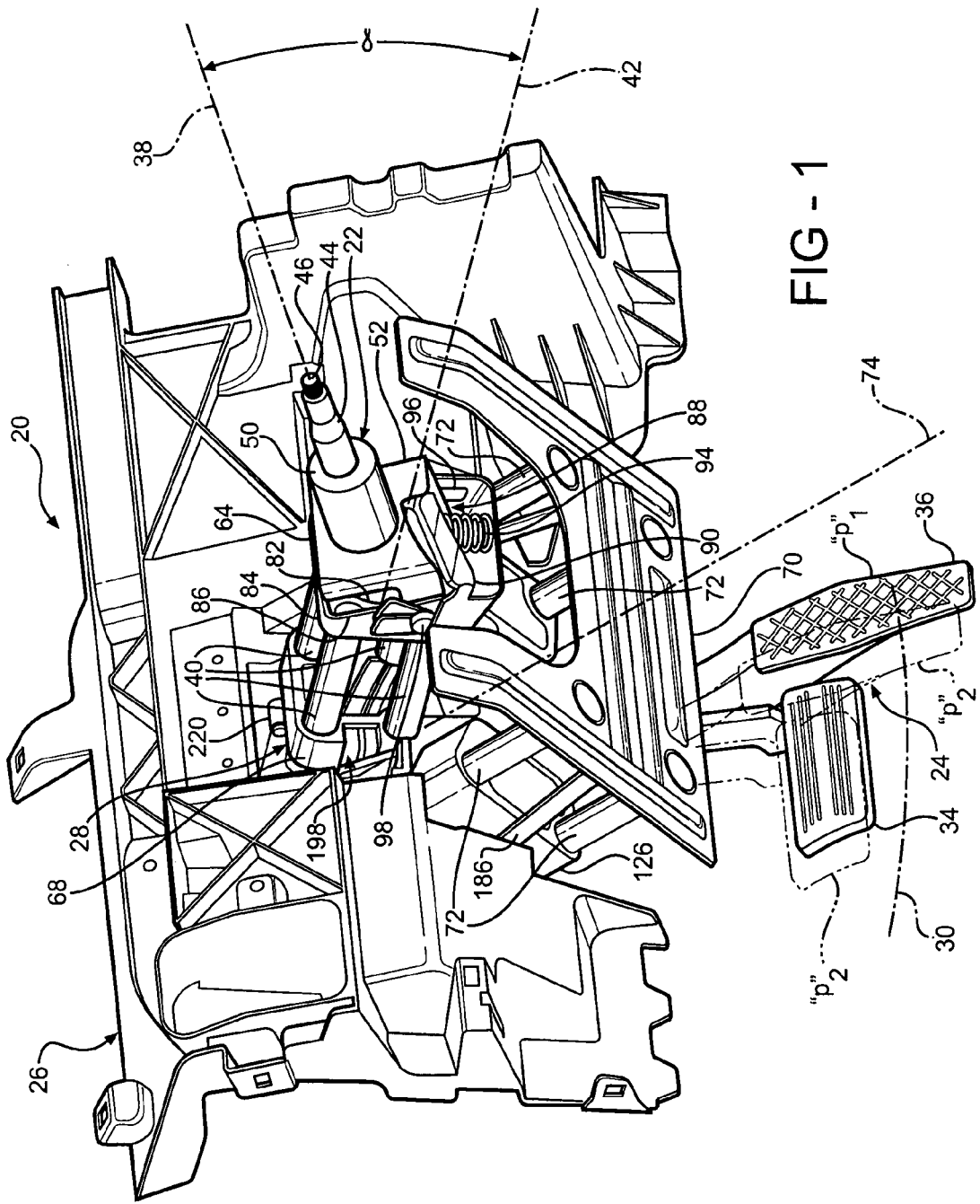
FIG. 1 is a perspective view of a collapsible steering column assembly according to one embodiment of the present invention installed on a vehicle subassembly.
Figure 2:
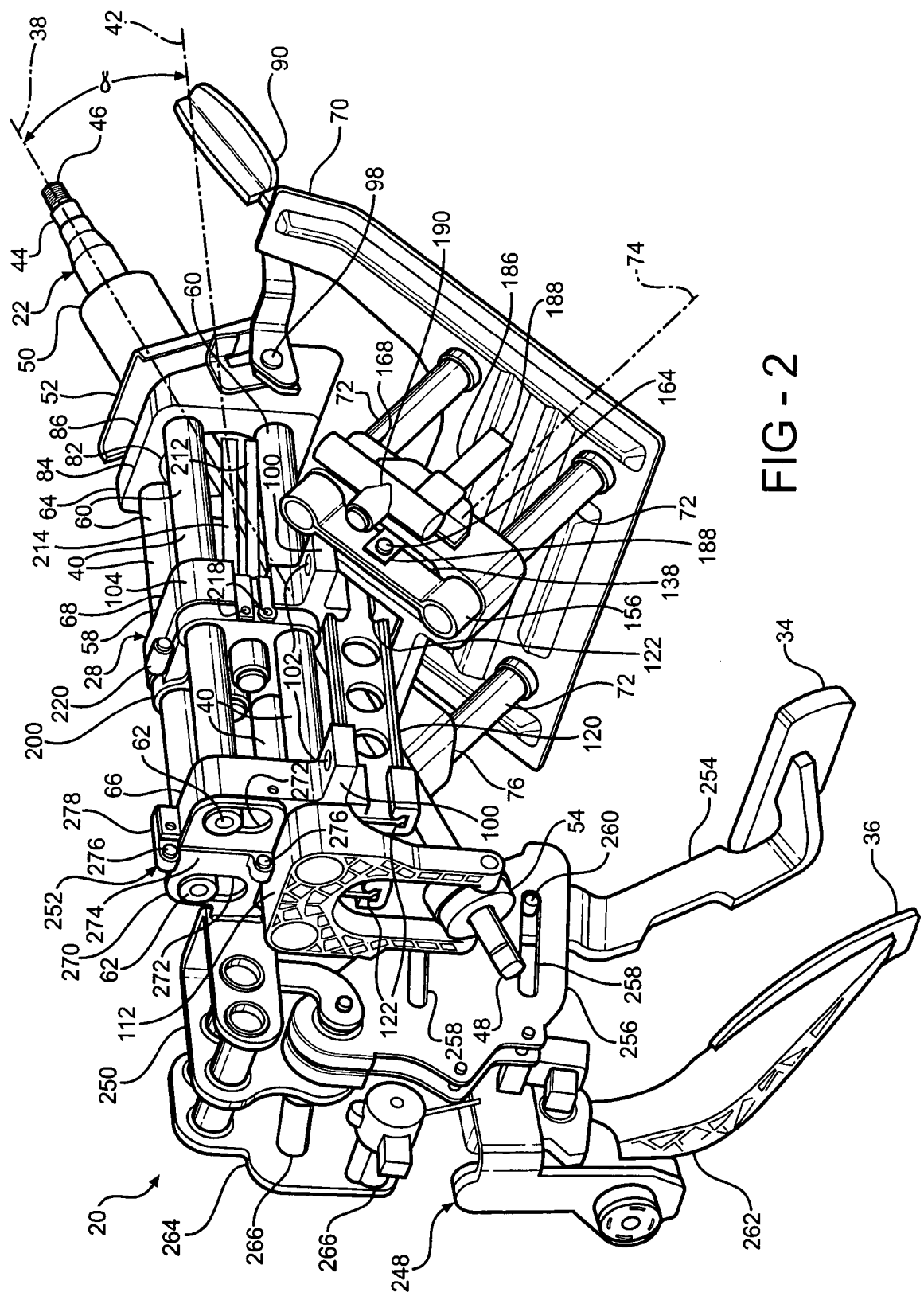
FIG. 2 is a perspective view of a steering column assembly according to FIG. 1 prior to installation on a vehicle subassembly and prior to a collision event.

The energy absorber system 164 of the assembly 20 also includes a second anvil-strap device, which is generally shown at 198 in FIG. 1. The second anvil-strap device 198 interconnects the steering tubes 40 and upper block 104. As is shown in FIG. 2, the second anvil-strap device 198 includes a release bracket 200. The release bracket 200 has bores therethrough and is disposed in engagement with the intermediate bracket 68 in the absence of the predetermined collapse force of the steering mechanism 22. The steering tubes 40 extend through the bores and are carried by the release bracket 200 in fixed relation to one another. Refering now to FIG. 8, at least one, or as disclosed, two pairs of plastically-deformable straps 204 with holes 206 therethrough are disposed in frictional engagement with respective pairs of first and second anvils 208 and 210. The straps 204 interconnect the release bracket 200 with the intermediate bracket 68. Each pair 204 includes a high-force strap 212 and a low-force strap 214 extending in parallel relation to one another from the release bracket 200. As is shown in FIGS. 2 and 3, retaining pins 218 are disposed within the release bracket 220. Each pin 218 extends through one of the holes 206 and interconnects the associated strap 212 or 214 with the release bracket 200. The pins 218 may alternatively be disposed within the upper block 104 for securing the straps 212 and 214 with the upper block 104 (not shown).

Like the first anvil-strap devices 166, the second anvil-strap devices 198 are variable energy absorbing systems. However, the second anvil-strap devices 198 utilize pairs of S-straps having variable widths. One skilled in the art will appreciate that other energy absorbing devices may be used, including but not limited to those which employ one or more M-straps, J-straps, other straps, wires, pyrotechnic or other actuating devices, or a combination thereof.

A hinge assembly 220 extends from the release bracket 200. The hinge assembly 220 may be used for attaching an optional display screen or other control device (not shown) to the assembly 20.

Figure 9:
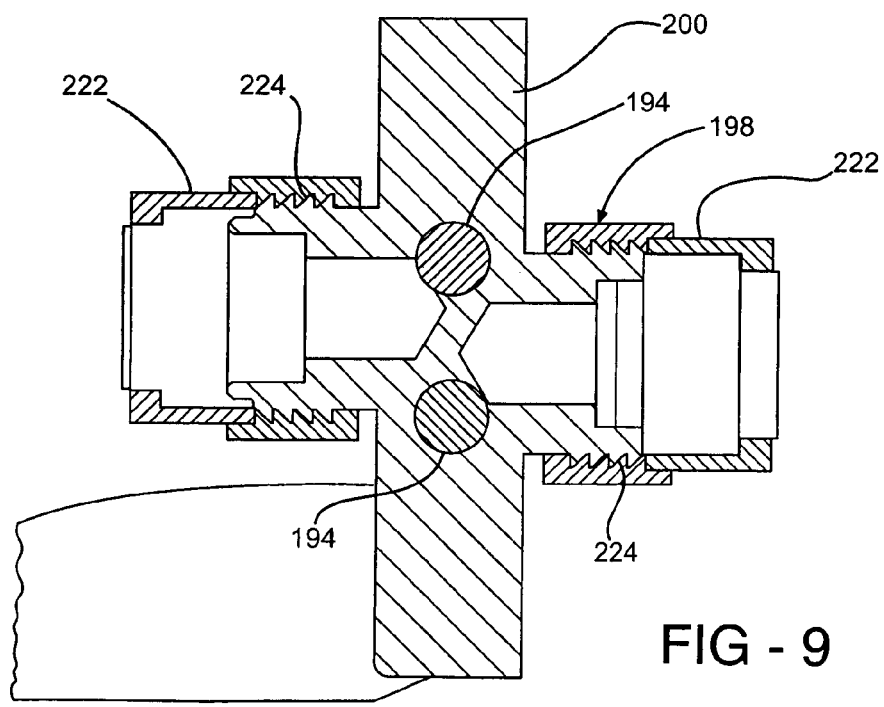
FIG. 9 is a partial cross-sectional view of a pair of pyrotechnic devices and pyrotechnic pins utilized in the second anvil-strap device.

Referring specifically to FIG. 9, the second anvil strap device 198 also includes actuating devices 222, which are disposed upon threaded bosses 224 that extend from the release bracket 200. Each device 222 engages one of the pins 194 and selectively discharges for actuating movement of the pin 194 to a discharged position. This alters the frictional force generated by the strap 212 or 214 associated with the pin 194 as the strap 212 or 214 moves across the anvils 208 and 210 shown in FIG. 8. Each pair of anvils 208 and 210 displaces a portion of the pair of straps 212 and 214 associated therewith and imposes a reaction force thereon to absorb energy as the straps 212 and 214 move past the anvils 208 and 210. The anvil-strap device 198 is shown in FIG. 3 after discharge of the devices 222 and following collapse of the steering assembly 22.

Although any suitable actuating device may be utilized, each actuating device 222 is preferably an electrically activated pyrotechnic device. A control system such as that which is schematically depicted at 192 in FIG. 4 is operatively connected to the devices 222, monitors and detects variable components affected by the crash condition, determines the amount of energy to be absorbed, and transmits a signal corresponding to that amount to the actuating devices 222, which in turn actuates one or more of the devices 222. For example, during a crash condition in which a large predetermined force is applied to the assembly 20, none of the actuating devices 222 will be discharged in order to maximize the frictional forces between the pairs of straps 204 and the anvils 208 and 210, which in turn maximizes the amount of energy absorbed. The actuating devices 222 will initiate release of the low-force straps 214 in response to a moderate predetermined force on the assembly 20. The actuating devices 222 will respond to a low predetermined force on the assembly 20 by initiating release of the high-force straps 212.

Figure 10:
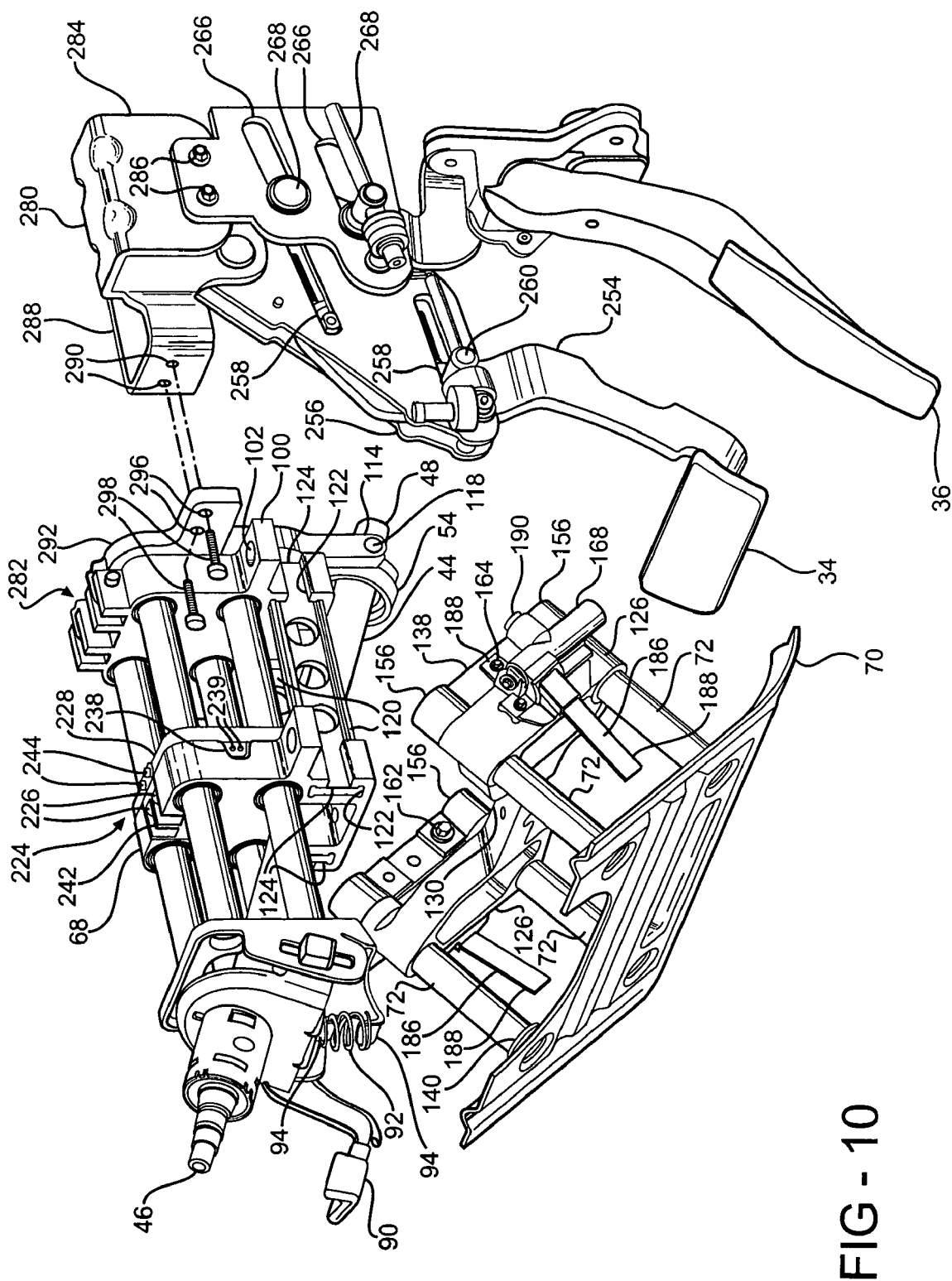
FIG. 10 is an exploded perspective view of the support, rear bracket and other selected components of the collapsible steering column assembly shown in FIGS. 1 through 3.

The assembly 20 may also use an alternative energy absorbing device, which is generally shown at 224 in FIGS. 10 and 11. The device 224 includes a single pair of high-force straps 226. A release bracket 228 releasably engages the intermediate bracket 68. The release bracket 228 includes bores 230 through which the steering tubes 40 extend in fixed relation to one another, and opposed sides 232 from which shear tabs 234 extend. A pair of pyrotechnic bosses 236 are disposed between the tabs 234 and bores 230. The release bracket 228 also has a pair of elongate chambers 238 extending therethrough in communication with the bosses 236.

The intermediate bracket 68 includes notches 238 in which the tabs 234 are disposed. Shear pins 239 interconnect each tab 234 and notch 238 for shearing in response to the predetermined collapse force to release the release bracket 228 from the intermediate bracket 68. The intermediate bracket 68 also has a slot 240 intermediate the bores 106. As is shown in FIG. 10, the strap guide 242 is disposed within the slot 240. Pyrotechnic pins 244 are disposed within the notches 238 and connect the straps 226 to the release bracket 228. The straps 226 extend from the pins 244 through the strap guide 242. Actuation devices 246 identical to the actuation devices 222 are disposed within the bosses 236 and are operatively connected to a control system like the control system 192 shown in FIG. 4. The pins 244 are selectively actuated by the actuation devices 246 to selectively control the rate of energy absorption by the straps 226 as the release bracket 228 moves away from the intermediate bracket 68.

Referring again to FIGS. 2 and 3, the assembly 20 also includes a pedal assembly, which is generally shown at 248. The pedal assembly 248 carries the pedals 24 or, as disclosed, the brake pedal 34 and throttle pedal 36. The pedal assembly 248 is also disposed against the steering tubes 40 for movement relative the support structure 12 in response to application of the predetermined collapse force to the steering mechanism 22. Specifically, the pedal assembly 248 is pivotally connected to the rear bracket 66 for pivotal movement in response to movement of the steering tubes 40 relative thereto.

The pedal assembly 248 is an adjustable pedal assembly. A mounting assembly 250 carries the pedals 24 and a hinge assembly 252 interconnects the mounting assembly 250 and the support structure 12 for permitting pivotal movement of the pedals 24 relative to the support structure 12. In particular, the hinge assembly 252 interconnects the mounting assembly 250 to the rear bracket 66.

The brake pedal 36 is part of a brake assembly 254. The brake assembly 254 includes a first bracket 256 that interconnects the brake pedal 34 and the mounting assembly 250. The first bracket 256 includes spaced slots 258. Adjustment fasteners 260 adjustably mount the brake pedal 34 in the slots 258 for permitting movement of the brake pedal 34 relative to the first bracket 256.

The throttle pedal 36 is part of a throttle assembly 262. A second bracket 264 having spaced slots 266 interconnects the throttle pedal 36 and the mounting assembly 250. Adjustment fasteners 268 adjustably mount the throttle pedal 36 in the slots 266 for adjusting the throttle pedal 36 relative to the second bracket 264.

The hinge assembly 252 features a bifurcated bracket 270 that carries the mounting assembly 250. The bifurcated bracket 270 has spaced openings 272 through which the rear ends 62 of two of the steering tubes 40 extend. A joint 274 is interposed between the openings 272 and extends between two nut and bolt assemblies 276. A hinge 278 is pivotally connects the bifurcated bracket 270 to the rear bracket 66, which permits pivotal movement of the mounting assembly 250 relative to the rear bracket 66.

Rather than utilizing the mounting assembly 250 and hinge assembly 252, the pedal assembly 248 may alternatively include a mounting assembly 280 and hinge assembly 282 such as those shown in FIGS. 10 and 11. In contrast to the mounting assembly 250, the mounting assembly 280 includes a U-shaped plate 284 having at least one nut and bolt assembly 286 extending therethrough for securing the brake and throttle assemblies 254 and 262 to the plate 284. An intermediate bracket 288 is disposed against the plate 284 and has holes 290 extending therethrough.

Figure 12:
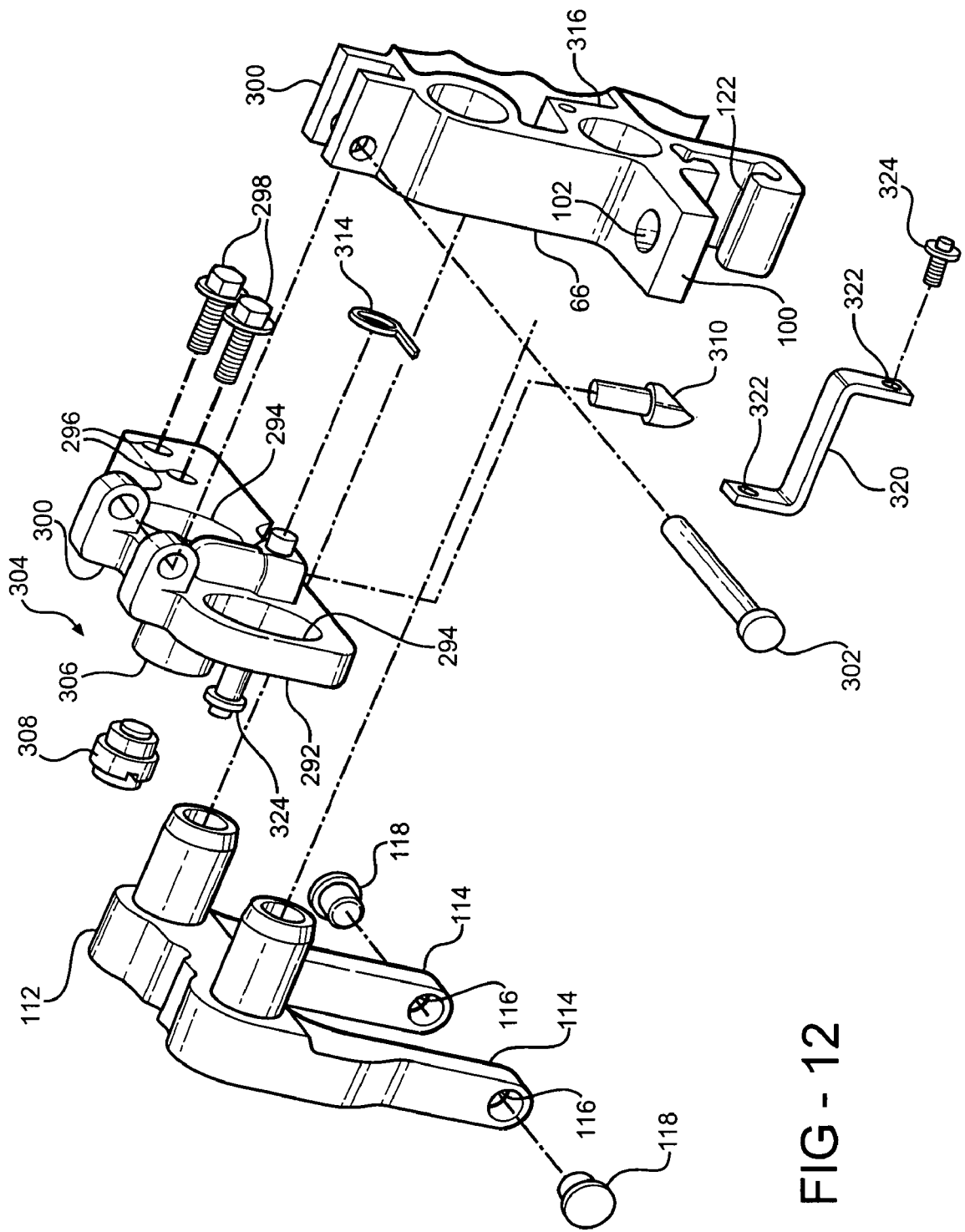
FIG. 12 is an exploded perspective view of the steering column mounting bracket and selected components of the pedal assembly shown in FIG. 11.

As is shown in FIGS. 11 and 12, the hinge assembly 282 includes a bracket 292 with spaced openings 294 through which the rear ends of two of the steering tubes 40 extend. The bracket 292 also has holes 296 aligned with the holes 290. A threaded bolt 298 extends through each pair of the holes 290, 296 for securing the intermediate bracket 288 to the bracket 292. A hinge device 300 connected together by a complementary hinge pin 302 interconnects the bracket 292 and rear bracket 66 together for permitting pivotal movement of the pedal assembly 248 relative to the rear bracket 66.

Referring now to FIGS. 12 and 13, the energy absorber system 164 also includes a shear strap mechanism 304 interconnecting the mounting assembly 280 and the rear bracket 66. The shear strap mechanism 304 includes a pyrotechnic housing 306 disposed between the openings 294 of the bracket 292. An actuating device 308 and a pedal shear pin 310 are disposed within the housing 306. The pedal shear pin 310 is held in position by a shear pin retaining clip 314. The rear bracket 66 includes a slot 316. A strap guide 318 is disposed within the slot 316. A plastically deformable strap 320 extends through the strap guide 318. The strap 320 has holes 322 therethrough. Energy-absorbing tapping screws 324 extend through the holes 322 and connect the strap 320 to the bracket 292 and rear bracket 66.

Although any suitable actuating device may be utilized, the actuating device 308 preferably comprises a gas generating pyrotechnic device. A control system such as that which is schematically depicted at 192 in FIG. 4 is operatively connected to the device 308. The control system monitors and detects variable components affected by the crash condition, determines the amount of energy to be absorbed, and transmits a signal corresponding to that amount to the actuating device 308, which in turn actuates the device 308. Furthermore, although a single plastically-deformable strap 320 is used in combination with a strap guide 318 to absorb energy, one skilled in the art will appreciate that other energy absorbing devices may be used, including but not limited to those which employ one or more M-straps, J-straps, other straps, wires, or a combination thereof.

The strap 320 maintains the bracket 292 in a stationary position relative to the rear bracket 66 in the absence of the predetermined collapse force 23 or 32. However, upon application of the predetermined collapse force on the steering mechanism 22 or the pedals 24, respectively, the actuating device 308 will "fire" or otherwise actuate and apply a downwardly directed force on the shear pin 310. This causes the retaining clip 314 to loosen, which in turn releases the shear pin 310. The pin 310 strikes and cuts the shear strap 320 apart, which frees the bracket 292 and permits pivotal movement of the pedal assembly 248 relative to the rear bracket 66. The strap 320 is pulled through the strap guide 318 and absorbs energy as the freed assembly 248 pivots relative to the rear bracket 66.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A collapsible steering assembly comprising;
a steering mechanism,
a pedal assembly including a mounting assembly and at least one foot pedal pivotally supported by said mounting assembly for moving between a fully retracted position and a fully depressed position to actuate an operating system in a vehicle, and
a support structure connecting said pedal assembly to said steering mechanism to define a unitized module with said support structure including at least one mounting bracket for mounting said unitized module to the vehicle,
said support structure movably supporting said steering mechanism for collapsing along a first collapse path relative to said at least one mounting bracket in response to application of a first predetermined collapse force to said steering mechanism and further movably supporting said pedal assembly for collapsing along a second collapse path relative to said at least one mounting bracket in response to application of a second predetermined collapse force to said at least one pedal.

2. A collapsible steering assembly as set forth in claim 1 wherein said pedal assembly is collapsible independently of said steering mechanism.

3. A collapsible steering assembly as set forth in claim 2 wherein said at least one pedal comprises a brake pedal.

4. A collapsible steering assembly as set forth in claim 3 wherein said steering mechanism includes a longitudinal steering axis extending transversely to the first collapse path.

5. A collapsible steering assembly as set forth in claim 4 wherein said support structure includes a plurality of steering guide rods arranged about a common collapse axis in non-parallel relationship to said steering axis.

6. A collapsible steering assembly as set forth in claim 1 including a hinge assembly interconnecting said mounting assembly and said support structure for permitting pivotal movement of said pedal assembly relative to said support structure.

7. A collapsible steering assembly as set forth in claim 6 and including a plurality of steering shear elements interconnecting said steering guide rods and said support structure for preventing movement of said steering mechanism relative to said support structure and shearable in response to application of the first predetermined collapse force on said steering mechanism for allowing said steering guide rods and said steering mechanism to move relative to said support structure.

8. A collapsible steering assembly as set forth in claim 7 wherein said steering guide rods are fixed relative to one another.

9. A collapsible steering assembly as set forth in claim 8 wherein said steering guide rods are straight.

10. A collapsible steering assembly as set forth in claim 9 wherein each of said steering guide rods comprises a steering tube extending from a front end to a rear end.

11. A collapsible steering assembly as set forth in claim 10 wherein each of said steering shear elements comprises a bushing surrounding each steering tube and engaging said support structure.

12. A collapsible steering assembly as set forth in claim 10 wherein said support structure includes a front bracket interconnecting said front ends of said steering tubes, an intermediate bracket, and said at least one mounting bracket is further defined as a rear bracket supporting said rear ends of said steering tubes and said steering mechanism, said front and rear brackets being spaced from and on opposite sides of said intermediate bracket.

13. A collapsible steering assembly as set forth in claim 12 wherein said steering tubes comprise four tubes spaced from one another in a quadrangle.

14. A collapsible steering assembly as set forth in claim 12 wherein said rear bracket includes a connector for attachment to the vehicle.

15. A collapsible steering assembly as set forth in claim 12 wherein said rear ends of said steering tubes extend through said rear bracket.

16. A collapsible steering assembly as set forth in claim 10 including a knee bolster coupled to said support structure.

17. A collapsible steering assembly as set forth in claim 16 wherein said support structure includes a front bracket interconnecting said front ends of said steering tubes, an intermediate bracket, and said at least one mounting bracket is further defined as a rear bracket supporting said rear ends of said steering tubes and said steering mechanism, said front and rear brackets being spaced from and on opposite sides of said intermediate bracket.

18. A collapsible steering assembly as set forth in claim 17 including a plurality of bolster guide rods arranged about a second collapse axis and interconnecting said intermediate bracket and said knee bolster and supporting said knee bolster for axial movement along said second collapse axis in response to application of a predetermined bolster collapse force to said knee bolster.

19. A collapsible steering assembly as set forth in claim 18 and including a plurality of bolster shear elements interconnecting said bolster guide rods and said intermediate bracket for preventing movement of said knee bolster relative to said intermediate bracket and shearable in response to application of the predetermined bolster collapse force to said knee bolster for allowing said bolster guide rods and said knee bolster to move relative to said intermediate bracket.

20. A collapsible steering assembly as set forth in claim 19 wherein said intermediate bracket supports said bolster guide rods in a fixed relationship to one another.

21. A collapsible steering assembly as set forth in claim 20 wherein said bolster guide rods are straight.

22. A collapsible steering assembly as set forth in claim 21 wherein each of said bolster guide rods comprises a tube.

23. A collapsible steering assembly as set forth in claim 22 wherein each of said bolster shear elements comprises a bushing surrounding each of said bolster tubes and engaging said intermediate bracket.

24. A collapsible steering assembly as set forth in claim 22 wherein said bolster tubes comprise four of said tubes spaced from one another in a quadrangle.

25. A collapsible steering assembly as set forth in claim 22 wherein said bolster tubes have front and rear ends, said knee bolster connected to said front ends of said bolster tubes and said rear bracket supporting said rear ends of said bolster tubes, said knee bolster and said rear bracket being spaced from and on opposite sides of said intermediate bracket.

26. A collapsible steering assembly as set forth in claim 25 wherein said intermediate bracket includes an upper block having bores therethrough with said steering tubes extending through said bores and a lower block having bores therethrough with said bolster tubes extending through said bores in said lower block.

27. A collapsible steering assembly as set forth in claim 26 including a second plurality of steering shear elements interconnecting said rear bracket and said steering tubes for preventing movement of said steering tubes relative to said rear bracket and shearable in response to application of the first predetermined collapse force to the steering mechanism for allowing said steering tubes to move through said rear bracket.

28. A collapsible steering assembly as set forth in claim 26 including an energy absorber system for absorbing energy during movement of said steering mechanism and said pedal assembly respectively relative to said intermediate bracket.

29. A collapsible steering assembly as set forth in claim 28 wherein said energy absorber system includes an anvil-strap device interconnecting said steering tubes and said upper block.

30. A collapsible steering assembly as set forth in claim 29 wherein said energy absorber system includes a shear strap mechanism interconnecting said mounting assembly and said rear bracket for absorbing energy upon movement of said pedal assembly.

31. A collapsible steering assembly as set forth in claim 22 wherein said bolster tubes are disposed on either side of said steering tubes.

32. A collapsible steering assembly as set forth in claim 31 wherein said bolster tubes are disposed transversely to said steering tubes.

33. A collapsible steering assembly as set forth in claim 32 including a connecting clamp interconnecting said rear ends of said bolster tubes, said bolster supported by said front ends of said bolster tubes.

34. A collapsible steering assembly as set forth in claim 33 wherein said energy absorber system includes an anvil-strap device interconnecting said clamp and said lower block for absorbing energy upon movement of said bolster tubes through said lower block.

35. A collapsible steering assembly as set forth in claim 34 wherein said steering tubes include an upper pair and a lower pair, a steering mechanism support bracket interconnecting said lower pair of tubes and supporting said steering mechanism.

36. A collapsible steering assembly as set forth in claim 35 including at least one beam interconnecting said upper block and said rear bracket to prevent relative movement therebetween.

37. A collapsible steering assembly comprising:
a steering mechanism;
a pedal assembly including a mounting assembly and at least one foot pedal pivotally supported by said mounting assembly for moving between a fully retracted position and a fully depressed position to actuate an operating system in a vehicle; and
a support structure connecting said pedal assembly to said steering mechanism to define a unitized module with said support structure including at least one mounting bracket for mounting said unitized module to the vehicle,
said support structure slidably supporting said steering mechanism for collapsing along a linear collapse path relative to said at least one mounting bracket in response to application of a first predetermined collapse force to said steering mechanism and further pivotally supporting said pedal assembly for collapsing along an arcuate collapse path relative to said at least one mounting bracket in response to application of a second predetermined collapse force to said at least one pedal.

* * * * *